(12) United States Patent
Seib et al.

(10) Patent No.: US 7,425,680 B2
(45) Date of Patent: Sep. 16, 2008

(54) CEILING LAMP JUNCTION BOX ASSEMBLY

(75) Inventors: James N. Seib, Williams, IN (US);
Anton Lepitsch, Indianapolis, IN (US);
Anthony J. Parker, Greenfield, IN (US)

(73) Assignee: Pynco, Inc., Bedford, IN (US)

( * ) Notice: Subject to any disclaimer, the term of this patent is extended or adjusted under 35 U.S.C. 154(b) by 516 days.

(21) Appl. No.: 11/177,874

(22) Filed: Jul. 8, 2005

(65) Prior Publication Data

US 2007/0007286 A1    Jan. 11, 2007

(51) Int. Cl.
*H01H 9/02* (2006.01)
(52) U.S. Cl. ............................. 174/58; 174/60; 174/61; 174/64; 174/135; 220/3.2; 248/906
(58) Field of Classification Search .................. 174/58, 174/50, 60, 57, 61, 64, 135, 54; 220/3.2, 220/3.3, 3.4, 3.5; 439/535; 248/343, 906; 52/220.4
See application file for complete search history.

(56) References Cited

U.S. PATENT DOCUMENTS

| | | | |
|---|---|---|---|
| 5,057,979 A | 10/1991 | Carson et al. | |
| 5,222,800 A | 6/1993 | Chan et al. | |
| 5,374,812 A | 12/1994 | Chan et al. | |
| 5,452,816 A | 9/1995 | Chan et al. | |
| 5,588,737 A | 12/1996 | Kusmer | |
| 5,661,264 A * | 8/1997 | Reiker | 174/50 |
| 5,662,414 A | 9/1997 | Jennings et al. | |
| 5,690,423 A | 11/1997 | Hentz et al. | |
| 5,746,507 A | 5/1998 | Lee | |
| 5,758,959 A | 6/1998 | Sieczkowski | |
| 5,857,766 A | 1/1999 | Sieczkowski | |
| 5,957,574 A | 9/1999 | Hentz et al. | |
| 6,004,011 A | 12/1999 | Sieczkowski | |
| 6,089,732 A | 7/2000 | Wright et al. | |
| 6,242,696 B1 | 6/2001 | Reiker | |
| 6,281,439 B1 | 8/2001 | Reiker | |
| 6,283,430 B1 | 9/2001 | Schubert et al. | |
| 6,423,899 B1 | 7/2002 | Reiker | |
| 6,461,016 B1 | 10/2002 | Jamison et al. | |
| 6,502,966 B1 | 1/2003 | Wu | |
| 6,545,216 B1 | 4/2003 | Bell et al. | |
| 6,659,627 B2 | 12/2003 | Caluori | |
| 6,720,496 B1 | 4/2004 | Weeks | |
| 6,940,016 B1 * | 9/2005 | Cornett et al. | 174/58 |
| 2003/0161155 A1 | 8/2003 | Caluori | |
| 2003/0223240 A1 | 12/2003 | Houle | |

* cited by examiner

*Primary Examiner*—Dhiru R Patel
(74) *Attorney, Agent, or Firm*—Woodard, Emhardt, Moriarity, McNett & Henry LLP

(57) ABSTRACT

A ceiling lamp junction box assembly is composed of a base and an outer shell combined of two half portions that interlockingly combine to enclose electronic components contained therein. In addition, a protective plate is placed in a recess defined in the bottom of the outer shell to protect the electronic components and the outer shell during installation of the junction box. A dovetail portion present on the outer surface of the outer shell combines with a slot defined in the base to help improve rotational stability.

19 Claims, 4 Drawing Sheets

US 7,425,680 B2

CEILING LAMP JUNCTION BOX ASSEMBLY

TECHNICAL FIELD

The devices described herein relate to junction boxes, more particularly, but not exclusively, to a ceiling lamp junction box assembly.

BACKGROUND

Attaching an electrical junction box to the ceiling in a residential or commercial piece of real estate is well known in the art. Junction boxes are required by code and prevent and/or mitigate the chances that a fire will break out due to faulty connections between the wires running through the ceiling. A junction box provides a protective volume wherein the wire connections from two or more cables are made. If the connections are faulty, the wires will heat up, and may emit sparks. A junction box is intended to serve as a safety barrier between any sparks or hot wires and nearby combustible material. In addition, junction boxes simplify and facilitate the connecting of wires from two or more cables and they also provide a stable support from which a ceiling lamp housing can be anchored.

Installing junction boxes is tedious and time consuming. In addition, the weight of the lamp connected to the junction box over time can cause the junction box to fail. Moreover, if an objects strikes or rotates the lamp it can damage the corresponding junction box or sever the connection between them. During installation junction boxes may be damaged.

Therefore, needs exist in this area of technology.

SUMMARY

A ceiling lamp junction box comprising a detachable base having a side mounting surface, the base defining a recess; an electronic component; and a member formed from the combination of two interlocking generally half sections, the member including a top area, the top area of the member being received by the recess of the detachable base, wherein the combination of the two interlocking components defines an inner space that contains the electronic component.

A ceiling lamp junction box comprising a base defining a recess and a slot, the base including a side mounting surface for coupling to the ceiling; an electronic component; and an outer shell to be received by the recess, the outer shell having a dovetail portion along its outer surface, wherein the outer shell defines an interior space to contain the electronic component, wherein the dovetail portion is constructed and arranged to be received by the slot.

A ceiling lamp junction box assembly comprising a ceiling lamp junction box assembly having a bottom surface, a side mounting surface and a recess defined in the bottom surface; and an attachable protective plate attached below the bottom surface and generally parallel to the bottom surface, the attachable protective plate including indentations sized appropriately for allowing fasteners to attach directly to the bottom surface, the attachable protective plate including at least one notch along its edge sized appropriately for a screw driver blade, the protective plate constructed and arranged to receive by the recess defined in the bottom surface.

DETAILED DESCRIPTION OF THE SELECTED EMBODIMENTS

For the purposes of promoting an understanding of the principles of my devices, reference will now be made to selected embodiments that include my preferred embodiments, and specific language will be used to describe the same. It will nevertheless be understood that no limitation of the scope of the claims of the invention is thereby intended. Any alterations, modifications, and further applications of the principles of my devices as illustrated are contemplated as would normally occur to one skilled in this art.

The devices described in this application generally relate to a ceiling lamp junction box assembly. The preferred ceiling lamp junction box assembly includes a generally circular shaped base that defines a recess. A pan box, which can be considered an outer shell or member, is formed of two generally symmetrical halves possessing a half-cylindrical shape and defining an interior space. The two half-cylindrical halves combine together and interlock using snaps to enclose an electrical component inside. The pan-box includes a dovetail portion that is receivable by a slot defined in the base. It is noted that in some embodiments, the dovetail portion is formed by the combination of the two members. In other embodiments, the dovetail portion is present just on one half section. Alternatively, the entire pan-box is one piece with a dovetail portion in some embodiments. The pan-box and the base are held together using fasteners, such as screws. Also included is a protective plate for protecting the junction box assembly during installation from dust and damage. The protective plate defines indentations to allow the screw heads to contact the pan box directly. Also, notches along the side are defined in the protective top plate. These formations facilitate the easy removal of the protective plate once the ceiling lamp junction box assembly has been installed.

Figure 1:
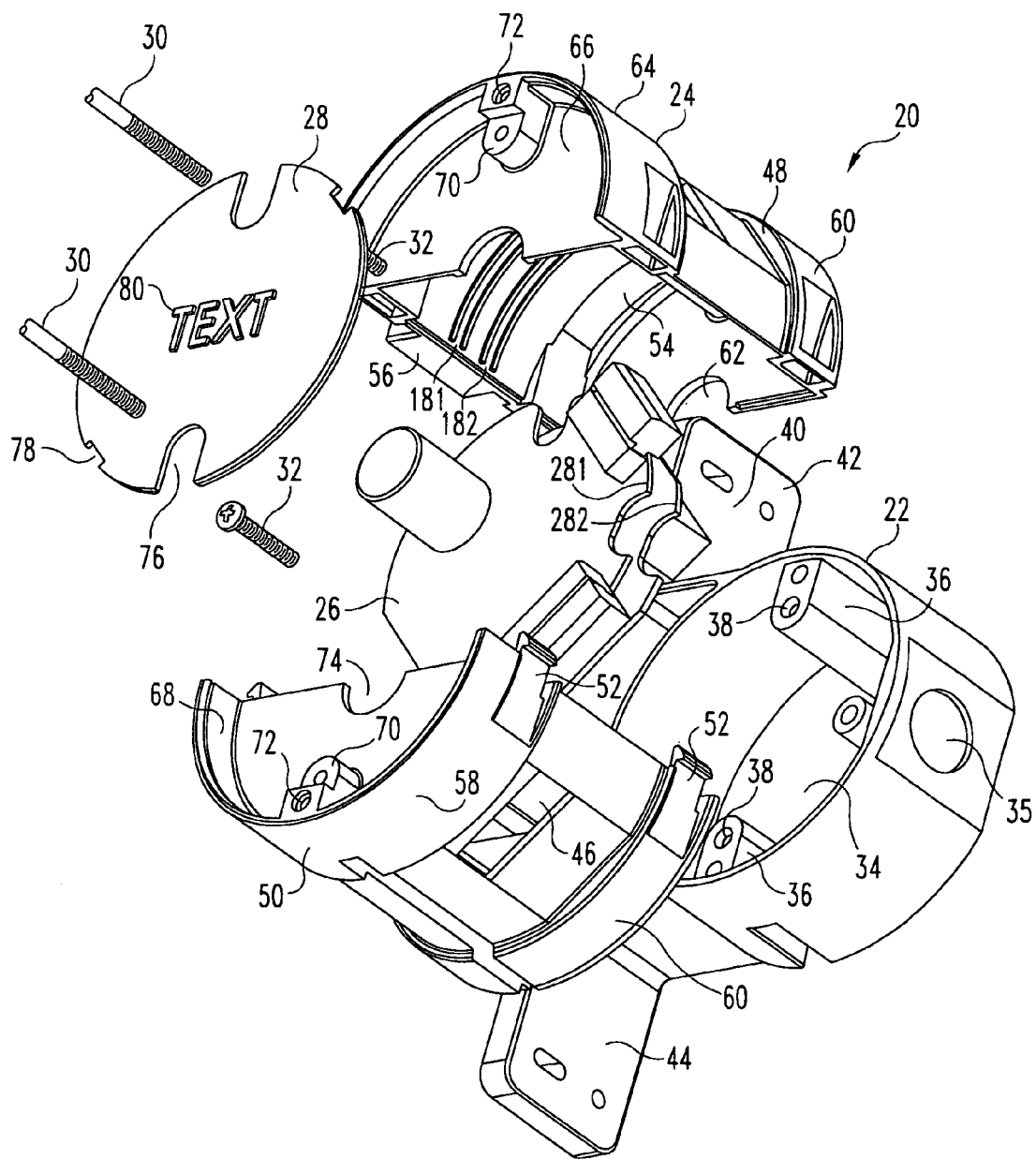
FIG. 1 is an exploded perspective view of a junction box assembly according to one embodiment.

Referring now to the drawings, FIG. 1 illustrates a ceiling lamp junction box assembly 20 according to my preferred embodiment. The ceiling lamp junction box assembly 20 includes a base 22. The base 22 includes a junction box for mounting to a ceiling. The base 22 includes a circular knock out opening 35 for wiring to enter the base. Also, there is a member 24 that is an outer shell designed to contain the electrical components 26. There is a protective plate 28 that is placed on the bottom of the member 24 to protect the member 24 during installation of the ceiling lamp junction box assembly 20. In addition, there is a first fastener set 30 that is used to combine the member 24 and the base 22 together. Moreover, there is a second fastener set 32 that is used to affix the light fixture to the ceiling lamp junction box assembly 20.

The base 22 defines a recess 34 that is constructed and arranged to receive the member 24. In the illustrated embodiment, it is shown that the recess 34 of the base 22 completely encloses the member 24 once assembled. Other embodiments contemplate other sizes and shapes of recess 34. In addition, the base 22 includes a pair of projections 36 that are operable to provide a way to couple base 22 to the member 24. The projections 36 define bores 38 that are designed to receive the first fastener set 30. The base 22 also includes a side mounting surface 40 for enabling the base 22 to be attached to the ceiling (not shown). In some embodiments, the side mounting surface 40 is constructed and arranged to attach to a ceiling joist (not shown). Other embodiments attach to the ceiling in alternate methods contemplated by those skilled in the art.

Figure 3:
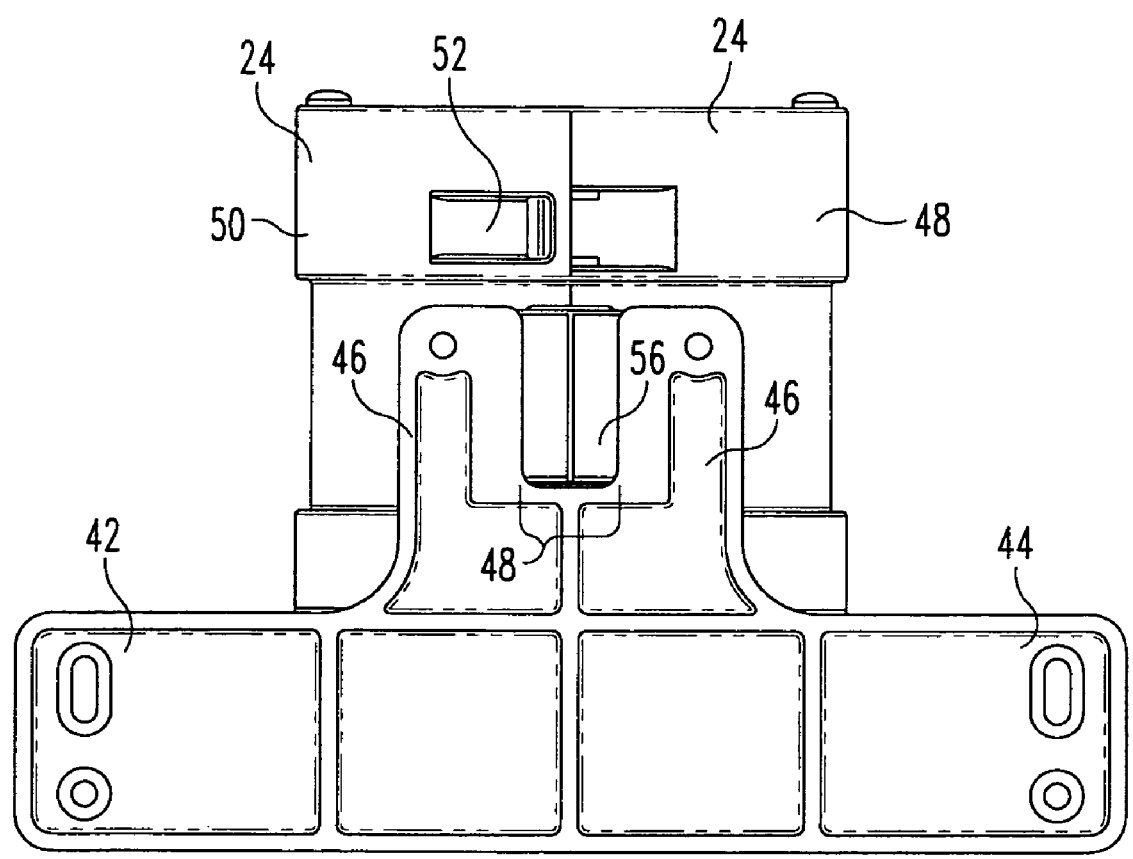
FIG. 3 is a rear side view illustrating the combination of the junction box assembly illustrated in FIG. 1.

Referring now also to FIG. 3, the side mounting surface 40 is composed of a first wing 42 and a second wing 44. The first wing 42 and second wing 44 are used to provide a broad surface area for mounting. Accordingly, the weight and the force on the ceiling lamp junction box assembly is spread across a wide area to improve stability. In addition, the base 22 includes prongs 46 that define a slot 48. The slot 48 is used with a portion of the member 24 as further described below.

Referring back to FIG. 1, we see that member 24 is composed of first half portion 48 and second half portion 50. In the illustrated embodiment, the half portions 48 and 50 are shaped to define a shape of a half portion of a cylinder with a space defined therein. The two half portions 48 and 50 interlock together using snaps 52 in the illustrated embodiment. It is of course recognized that those skilled in the art could devise many different ways of allowing the different portions to combine. Furthermore, those skilled in the art would readily recognize that different shapes or ways of combining the two half portions 48, 50 could exist. For example, in one alternate embodiment, the half portions 48, 50 could be combined together along a horizontal axis. Alternatively, in other embodiments they could be unsymmetrical. Accordingly, those skilled in the art will recognize that the member 24 simply forms by the combination of two parts.

The combination of the first half portion 48 and the second half portion 50 results in an interior space 54 being defined inside of the member 24. Those skilled in the art recognize that this creates an outer shell that can enclose the electronic components 26 inside. The pan-box holds these electronic components to ensure that they are safely contained. The half portions 48 and 50 also each include a section of a dovetail portion 56 on the outer surface 58. In the illustrated embodiment, the dovetail portion 56 is the result of the combination of two sections that come together to make a resulting dovetail portion 56. Alternatively, in other embodiments, it is contemplated that the dovetail portion 56 is completely on one half portion. Other variations may have a member 24 that is not formed of two combined portions and therefore simply just may have the dovetail portion 56 on the outer surface 58 of the member 24.

Figure 2:
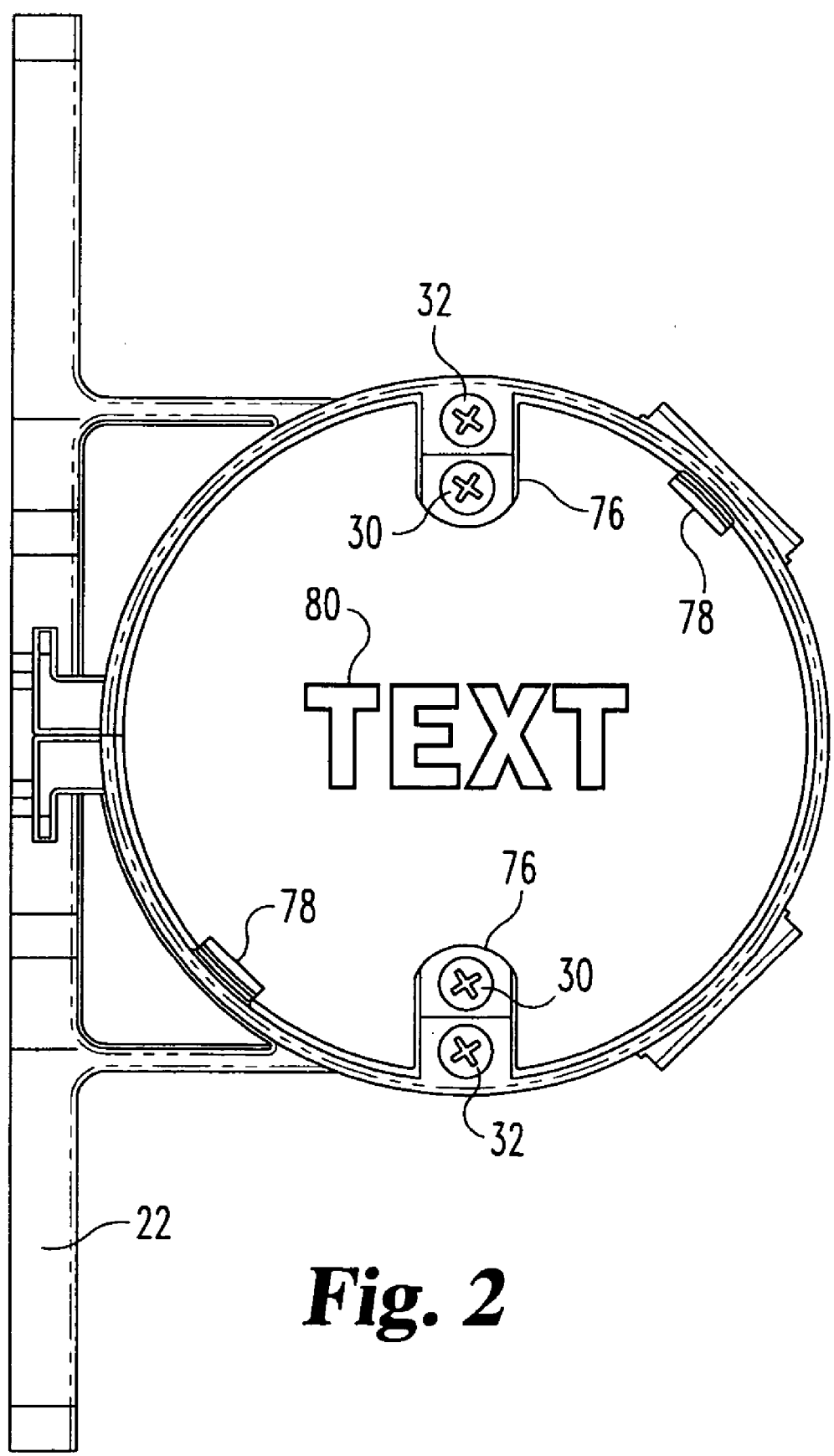
FIG. 2 is an assembled bottom view of the junction box assembly illustrated in FIG. 1.

Referring now to FIG. 3, and FIG. 2, it is illustrated that the dovetail section 56 combines with the base 22 along the slot 48. This combination increases the rotational stability of the member 24 ensuring that any outside force applied to the member 24 or the base 22 is applied to the structure to which it is mounted, typically a ceiling joist.

Referring back to FIG. 1, the member 24 also includes a top area 60 that is appropriately sized to fit into the recess 34 of the base 22. This top area 60 includes an opening 62 that allows wires from electronic components 26 to be attached through the base 22. In the example shown, the electronic components 26 include two circuit boards 281 and 282 that fit into grooves 181 and 182, respectively, on the inside of each half of member 24. In addition, the member 24 has a bottom area 64 that defines a recess 66 that is sized to receive the protective plate 28. The recess 66 is slightly below the outer lip 68 of the member 24 in order to provide a recess 66 where the protective plate 28 can be snugly received. In addition, there are projections 70 that have bores 72 defined therein to receive the fastener sets 30 and 32. This design allows the fasteners 30, 32 to be directly coupled to the member 24 to enable the easy removal of the protective plate 28 once its purpose has been fulfilled. The bottom area 64 also defines an opening 74 which allows access to wires from the electronic components 26 when installing a light fixture (not shown).

The protective plate 28 is used to protect the inside of the member 24 and the electronic components 26 from dust during installation. Furthermore, it is designed to protect the entire ceiling lamp junction box assembly 20 from tools used to cut the drywall that is installed on a ceiling after base 22 has been mounted, for example, to a ceiling joist. The protective plate 28 includes indentations 76 that allow it to fit over the projection 70 of the member 24 to enable the fastener sets 30, 32 to directly couple to the member 24. Therefore, these indentations 76 ensure that the protective plate 28 can be easily removed without removal of either fastener sets 30 or 32. In addition, the protective plate 28 includes notches 78 along the edge that are appropriately sized for a screwdriver blade or the like. These notches 78 are designed to facilitate removal once the purpose of the protective plate 28 has been fulfilled. A screwdriver or the like can be inserted into the notch 78 and used to pop out the protective plate 28 from the member 24. Additionally, in some embodiments, the protective plate 28 can include markings 80 that can be used to provide information to the user or even be an advertisement or the like.

Figure 4:
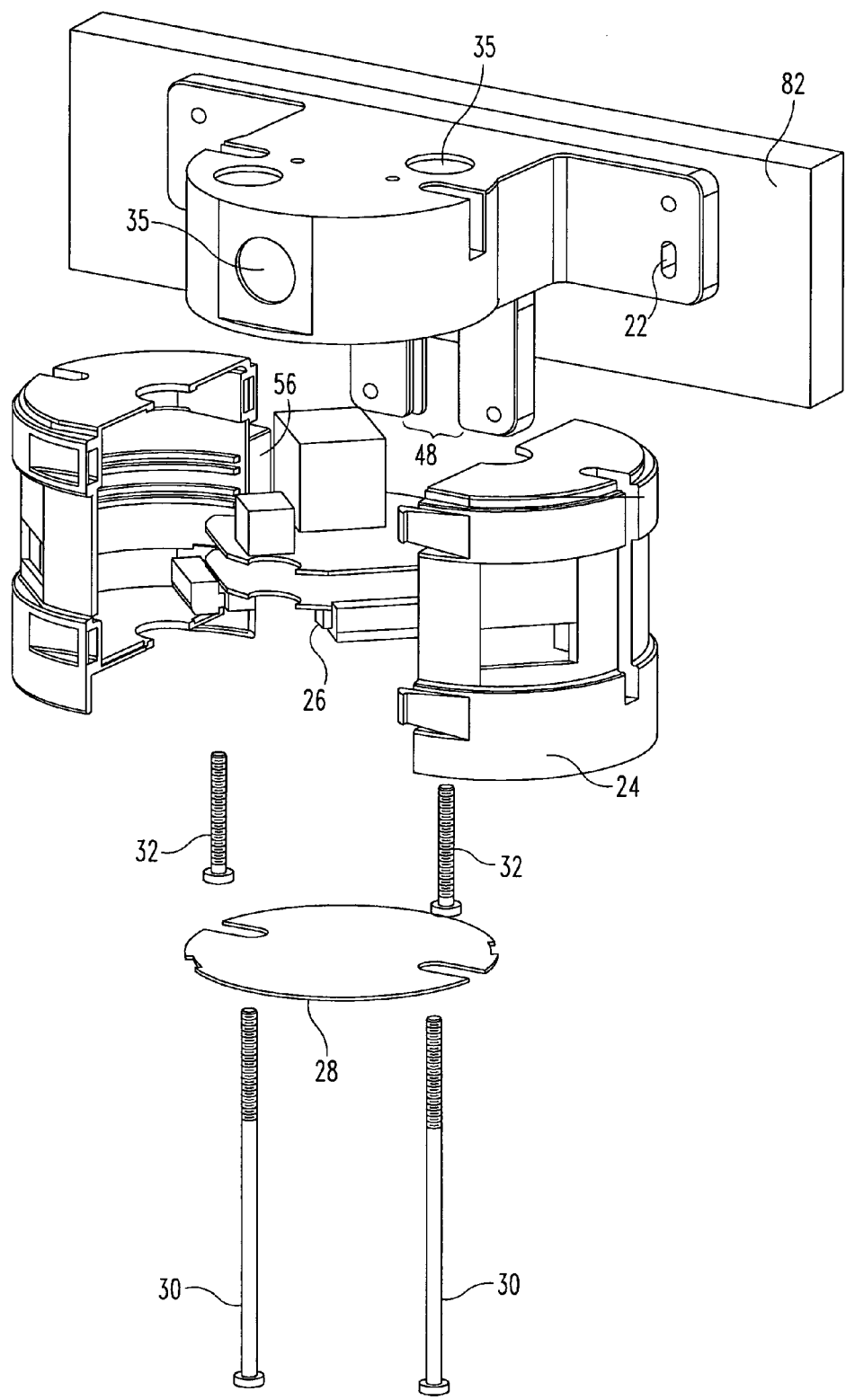
FIG. 4 is an alternate exploded perspective view of the junction box assembly of FIG. 1.

In use, the ceiling lamp junction box assembly 20 typically is installed as follows. During the installation in a house or other real estate structure, before the dry wall is placed on the ceiling or walls, the electrical infrastructure of the real estate structure is constructed. A location for a light fixture is determined. Then, the base 22 is mounted near the upper edge of one of the ceiling joists 82 as illustrated in FIG. 4. Outside wiring from the structure's circuit breaker box is run into base 22 through opening 35. Hot, ground return, and neutral wires from the top of the assembled unit 24 containing the electrical components 26 and plate 28 are connected to the outside wire at the base 22. Member 24 is then placed inside the recess 34 defined in the base 22. During insertion of the member 24, the dovetail portion 56 is received by the slot 48 to help prevent rotational instability. The first fastener set 30 is then inserted and screwed tight to affix the member 24 to the base 22. Then the drywall (not shown) for the ceiling is installed. To do so, a tool is used to cut a hole in the drywall (not shown) for the lighting fixture to be attached to. The protective plate 28 protects against damage to the electronic components 26 from the tool and from dust during the installation of the drywall (not shown). Thereafter, the protective plate 28 is removed and the lighting fixture (not shown) is mounted to member 24 using screws 32.

While selected embodiments have been illustrated and described in detail in the drawings and foregoing description, the same is to be considered as illustrative and not restrictive in character, it being understood that only a few embodiments have been shown and described. All contemplated embodiments are desired to be protected.

What is claimed is:

1. A ceiling lamp junction box comprising: a detachable base having a side mounting surface, the base defining a recess; n electronic component; and member formed from the combination of two interlocking generally half sections, the member including a top area, the top area of the member being received by the recess of the detachable base, wherein the combination of the two interlocking components defines an inner space that contains the electronic component.

2. The device of claim 1, wherein the side mounting surface is constructed and arranged to mount to a ceiling joist.

3. The device of claim 1, wherein the member is a pan-box.

4. The device of claim 1, wherein the half sections are vertically interlocking shells defining a generally half-cylinder shape.

5. The device of claim 1, the member further including a bottom area defining a recess.

6. The device of claim 5, further including a notched protective plate, wherein the protective plate is constructed and arranged to be received by the recess defined in the bottom area of the member.

7. The device of claim 1, wherein the interlocking half-sections form a dovetail portion.

8. The device of claim 7, the base further defining a slot to receive the dovetail portion.

9. The device of claim 1, wherein the base and the member are coupled using fasteners.

10. The device of claim 1, the recess of the base including projections contained therein and the member including indentations, wherein the projections and indentations operatively couple upon the receipt of the member into the recess defined by the base.

11. The device of claim 10 additionally comprising a slot in the base and a dovetail portion associated with at least one of the half sections and being received by the slot.

12. A ceiling lamp junction box comprising: a base defining a recess and a slot, the base including a side mounting surface for coupling to the ceiling; an electronic component; and an outer shell to be received by the recess, the outer shell having a dovetail portion along its outer surface, wherein the outer shell defines an interior space to contain the electronic component, wherein the dovetail portion is constructed and arranged to be received by the slot.

13. The device of claim 12, wherein the side mounting surface is constructed and arranged to mount to a ceiling joist.

14. The device of claim 12, wherein the outer shell is a pan-box.

15. The device of claim 12, wherein the outer shell comprises half sections that are interlockingly combinable.

16. The device of claim 12, the outer shell further including a bottom area defining a recess.

17. The device of claim 16, wherein the base and the outer shell are coupled using fasteners.

18. The device of claim 12, further including a notched protective plate, wherein the protective plate is constructed and arranged to be received by the recess defined in the bottom area of the member.

19. The device of claim 12, the recess of the base including projections contained therein and the outer shell including indentations, wherein the projections and indentations operatively couple upon the receipt of the outer shell into the recess defined by the base.

* * * * *